I. B. Snyder.
Harvester Rake.
N° 37463 Patented Jan. 20, 1863.

Sheet 2.
2 Sheets.

Witnesses.

Inventor.
Isaac B Snyder

I. B. Snyder.
Harvester Rake.
Nº 37463. Patented Jan. 20, 1863.

Witnesses.
Chs. R. Fraley.
Jacob Stauffer

Inventor.
Isaac B Snyder

UNITED STATES PATENT OFFICE.

ISAAC B. SNYDER, OF CLAY TOWNSHIP, LANCASTER COUNTY, PA.

IMPROVEMENT IN RAKING ATTACHMENTS FOR HARVESTERS.

Specification forming part of Letters Patent No. 37,463, dated January 20, 1863.

*To all whom it may concern:*

Be it known that I, ISAAC B. SNYDER, of Clay township, in the county of Lancaster and State of Pennsylvania, have invented a new and Improved Mode for Operating Rakes Attached to Harvesters or Reaping-Machines; and I do hereby declare that the following is a full and exact description thereof, reference being had to the accompanying drawings, and to the letters of reference marked thereon, making a part of this specification, in which—

Figure 3:
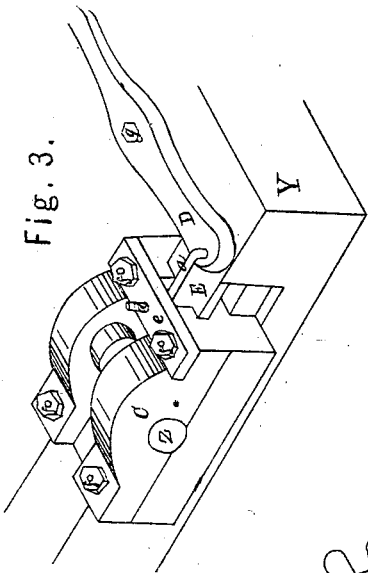
Figure 4:
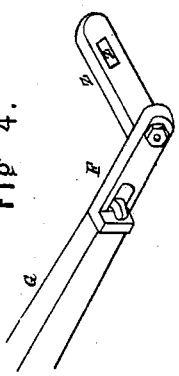
Figure 2:
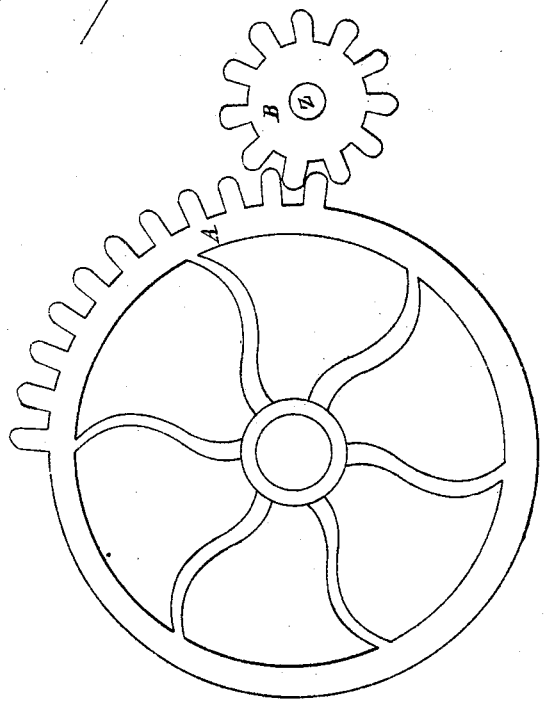
Figure 1:
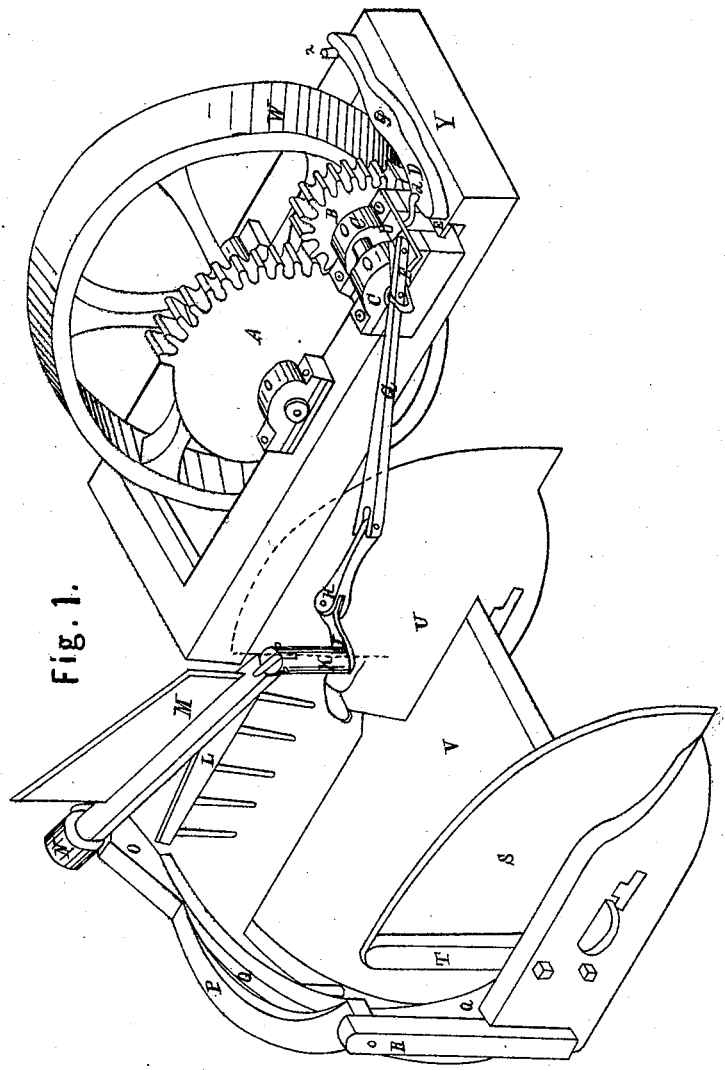

Figure 1 is a perspective view of the rake and its connection with the machine, showing the rake-head or its friction-roller N lodged in the notch on the inclined plane O over and beyond the discharging rear of the platform V. Fig. 2 is a profile view of the quarter-section wheel A and pinion B. Fig. 3 shows the sliding boxes C detached, (in part,) somewhat enlarged to show the plate E, rod *d*, and lever D more clearly. Fig. 4 shows the swivel-joint F of the connecting-rod G and crank Z, the latter being affixed to the shaft of the pinion B, so that by means of the swivel-joint the crank action can adapt itself to any inclination the platform may assume in consequence of inequalities in the ground.

In order to overcome the objections to crank motions connected with the revolution of the traction wheel or wheels being uniform and too slow, thereby causing the grain partly to lodge on the rake, so as to cause tangling, I employ a quarter-cogged wheel, A, on the shaft or axle of the driving-wheel W, to operate a pinion, B. Thus I obtain a raking motion by one revolution of the pinion B in one-fourth the time the main wheel makes its revolution, with an interval of rest during three-fourths of the time occupied by the main wheel A or W. (A cogged quadrant may be employed instead of a quarter-cogged wheel, A, if preferable.) During the interval of rest time is afforded for the cut grain to lodge upon the platform, when the action of the rake will come forward quickly and rake over the platform as quickly to clear it, to repeat the same operation after an interval of rest.

The operation is simple and readily understood by the illustration, Fig. 1. The pinion operating the crank and connections F G H with the rock-shaft and its arm I, with the latter of which the rake and its parts L M N are connected by a slot, tongue, and pivot, giving to the rake a back-and-forward motion, as well as to admit of its up-and-down motion on its pivot, it follows that when the rake-head, with its friction-roller N, is pressed forward up the inclined plane P (held by a pivot in R) it will of its own gravity drop over the terminus of P, down between the uprights R T, and lodge on the lower ledge, Q, carrying the rake L over the platform, under P to and up the inclined plane on O, (raising the end of P,) and lodging in its notch during the revolution of the blank or uncogged portion of the wheel A. Thus the motions of the rake are quick and effectual, occupying but one-fourth of the time the wheel takes in each revolution. To adapt this motion to platforms hung on or hinged to the driving portions of the machine, rising or falling with the undulations of the ground, I employ the swivel-connection F G, Fig. 4, which needs no further description. For unshifting the pinion B, I mount it in a compound or double sliding box, C, moving in a notch in the frame Y, and on a sliding plate, E, Fig. 3, operated by the lever D and its connecting-rod *d* through the cross-plate *e* in its motions. This box C carries the pinion B in and out of gear with the section-wheel A when the rake is to operate or not, as the case may be. A compound leverage may be employed, so as to reach it with the foot, (of the driver,) as circumstances may require.

I am aware that cogged gearing and crank motions to raking attachments or reapers are common and applied in divers manners; but I am not aware of any combination having ever been used in the manner herein set forth.

What I claim as my invention, and desire to secure by Letters Patent, is—

The specific arrangement of the inclined planes O P for giving the necessary elevation to the sweep-rake at each end of its stroke, in combination with the means of holding the rake during its interval of rest, and operating it in the manner specified.

ISAAC B. SNYDER.

Witnesses:
CHAS. R. FRAILEY,
JACOB STAUFFER.